July 26, 1932.  P. R. ZINSER  1,868,788
DIES AND PROCESS OF MAKING THE SAME
Filed May 4, 1928   3 Sheets-Sheet 1

Inventor,
Paul R. Zinser

Witness
William R. Kilroy

By Charles S. Wilson
Atty.

July 26, 1932.   P. R. ZINSER   1,868,788
DIES AND PROCESS OF MAKING THE SAME
Filed May 4, 1928   3 Sheets-Sheet 2

Witness
William P. Kilroy

Inventor
Paul R. Zinser
By Charles S. Wilson
Atty.

July 26, 1932. P. R. ZINSER 1,868,788
DIES AND PROCESS OF MAKING THE SAME
Filed May 4, 1928 3 Sheets-Sheet 3

Inventor
Paul R. Zinser
By Charles S. Wilson

Witness
William P. Kilroy

Patented July 26, 1932

1,868,788

UNITED STATES PATENT OFFICE

PAUL R. ZINSER, OF CHICAGO, ILLINOIS, ASSIGNOR, BY MESNE ASSIGNMENTS, TO WOODALL INDUSTRIES, INCORPORATED, OF DETROIT, MICHIGAN

DIES AND PROCESS OF MAKING THE SAME

Application filed May 4, 1928. Serial No. 275,119.

This invention relates to dies, and the process of making the same, and while it is of general application to dies of all kinds and characters, it particularly relates to those dies designed to operate upon and form and shape fibrous materials, such as paper, asbestos, cloth and the like.

It has for its object the production of a die capable of forming the material operated upon into all of the details of a design, intricate or otherwise, and yet be relatively inexpensive to produce and at the same time be strong, durable and capable of withstanding all of the strains and wear to which it is put.

With the above and other objects in view, as will be apparent, this invention consists in the steps, processes and manipulations, as well as the construction, combination and arrangement of parts, all as hereinafter more fully described, claimed and illustrated in the accompanying drawings, wherein:

Figure 1:
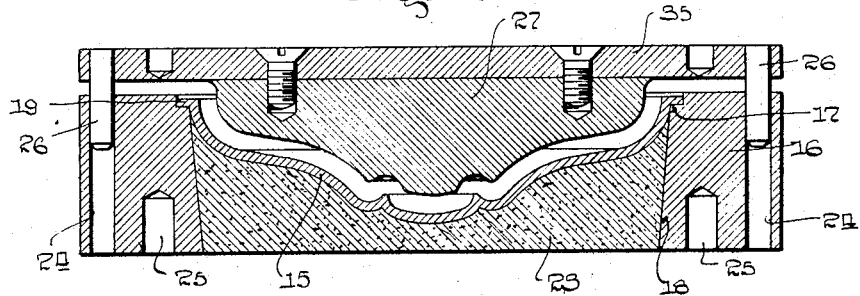
Fig. 1 is a vertical section through a male die and a female die constructed in accordance with the present invention.
Figure 2:
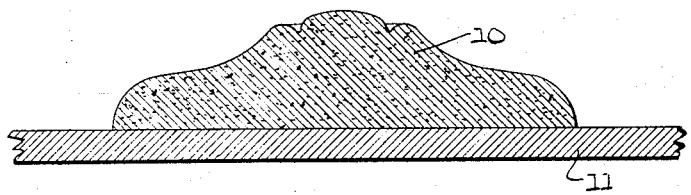
Fig. 2 is a similar section through the model of the design to be produced by the dies made in accordance with the present invention.
Figure 3:
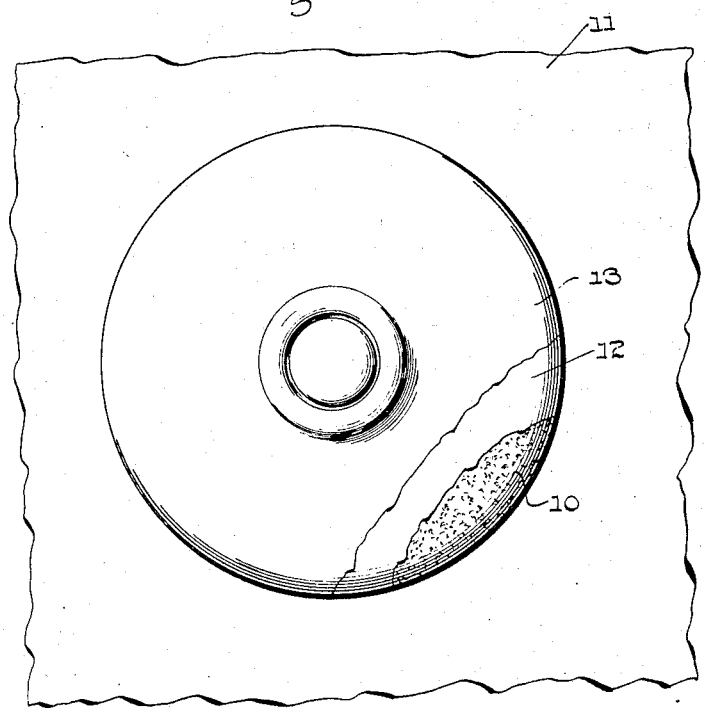
Fig. 3 is a plan view of the model showing the treatment and preparation thereof preliminary to the construction of the dies.
Figure 4:
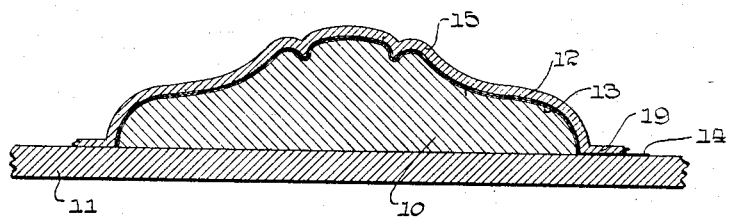
Fig. 4 is a vertical section through the model, illustrating the female die shell deposited thereon by the electrotyping or electroplating process.

The dies which form the subject matter of the present invention and which are produced by the present process are the female die and the male die. As the material operated upon is forced by the male die into the female die to conform to all of the details of the shape and form thereof, the latter must not only include all of the details of the design but must be sufficiently strong to withstand the necessary pressure. Heretofore such dies have been generally formed from solid blocks of steel or other suitable materials, usually by hand, and have consequently been expensive, as well as have required much time to produce.

The present female die and the process for producing it contemplates the production of a plaster model made, in all details, like the article to be produced. This may be done in many ways, one of which is to create the form and design of the article to be produced, in wax, making a plaster or other suitable mold or impression from the wax form and design, and casting the plaster model in the mold thus made. The method or process pursued in creating the plaster model forms no part of the present invention and therefore any method resulting in a suitable model irrespective of the material of which it is made, may be followed to answer the purposes hereof.

A metallic shell is then so formed over the model that it conforms to all of the details of the shape and form thereof, whereby the inner surface of the shell is an exact inverse replica of the shape, contour and design of the model. The shell thus formed is placed in a die ring and filled with sand or other suitable supporting material, after which molten metal is cast or poured into the ring at the back of the shell so that a solid female die is produced.

The process of producing the female die, thus briefly outlined, will be described in detail, reference being had more particularly to the drawings, wherein 10 designates the model produced in any suitable manner or of any suitable material which for the purposes hereof may be plaster. This model 10 is mounted on and preferably fixed to a model plate 11 which acts as a support therefor. When so mounted, the model 10 is coated with a layer 12 of wax or other suitable material, which fills the pores of the material from which the model 10 is constructed and renders the same water proof and acid proof. The surface of the model thus coated with wax is then sprayed with a mixture of lacquer or other binder and metallic powder, to create an electro-conductive layer 13 on the wax coating 12. The necessary electrical connections with the conductive layer 13 may be made through wires or other conductors 14 located at the edges of the model, after which the model 10 so treated is placed in a plating tank. A die shell 15 is thereby deposited on the coated surface of the model 10 and the latter is allowed to remain in the plating tank until the shell 15 has attained the required or desired thickness, usually one-eighth of an inch. It will be noted that the edge of the shell 15 is so formed and trimmed that it has an outstanding substantially horizontal lip 19 by which it will be seen, the shell may be supported and retained in the die ring. The shell 15 may then be readily removed from the model 10, and the same presents on its inner surface an exact replica of shape, contour and design of the model. The shell 15 may be considered ready to be incorporated in the female die as will be described.

Figure 6:
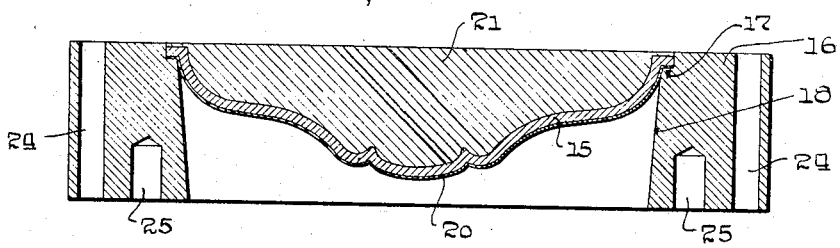
Fig. 6 is also a central vertical section of the female die shell mounted in the die ring, with the interior of the shell packed with sand.
Figure 7:
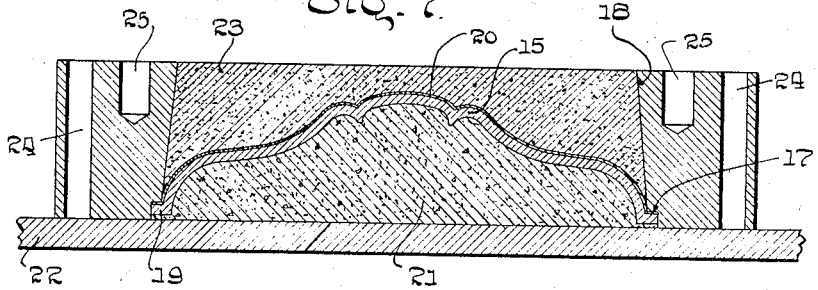
Fig. 7 is a similarly vertical section through the female die shell and the die ring, with their positions inverted, the face of the die filled with sand, and metal cast into the ring to back the die shell.
Figure 8:
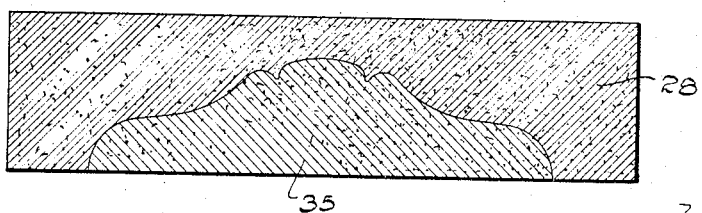
Fig. 8 is a section through an impression of the female die in combination with an intaglio impression thereof, being illustrative of one of the preliminary steps preparatory to the creation of a male die.
Figure 9:
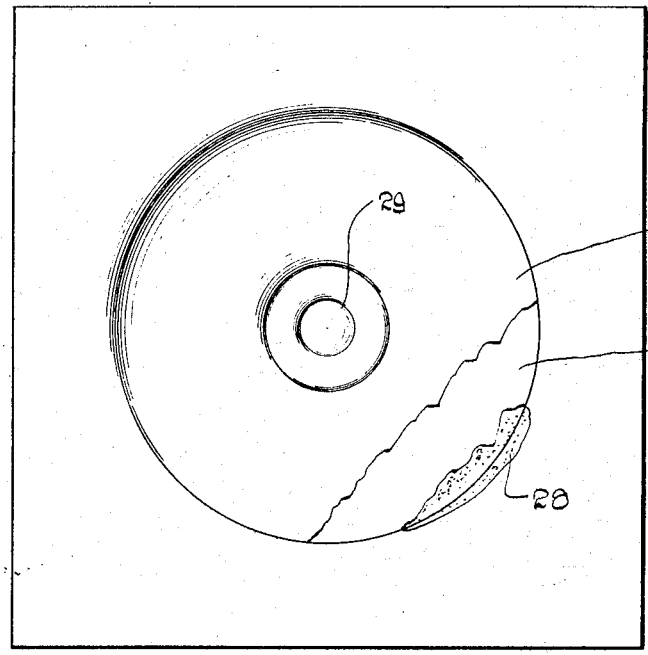
Fig. 9 is a plan view partly broken away to illustrate the formation and treatment of the intaglio impression.
Figure 10:
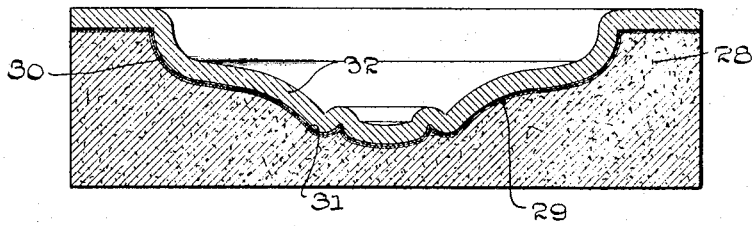
Fig. 10 is a vertical section of the intaglio impression with a model shell for the male die electroplated or deposited therein.
Figure 11:
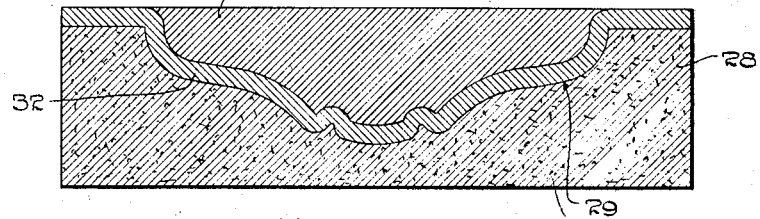
Fig. 11 is a similar view illustrating the formation of the pattern for the male die from said shell.
Figure 12:
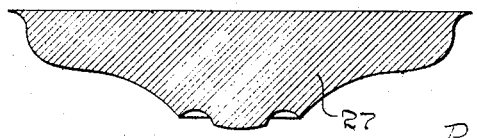
Fig. 12 is a vertical section of the male die.

To support and retain the shell 15, a die ring 16 is provided, being made of and in any suitable material or manner, such for instance as of cast brass. The inner face of the ring 16 is shouldered, as at 17, adjoining one edge thereof, the body or face 18 being sloped or inclined away from the base of the shoulder 17. The shell 15 is adapted to be mounted in the ring 16 with the lip 19 thereof resting on and supported by the shoulder 17 and the body of the shell generally housed within the said ring 16. The depth of the shoulder 17 is such that when the lip 19 is positioned therein, the body of the ring 16 will project somewhat beyond the exposed surface of said lip and/or shell 15, as illustrated in Figs. 1, 6 and 7. Thus, by projecting the body of the ring 16 slightly beyond the shell 15 and its lip 19, the shell is fully protected from any impact or contact with the male die or any other element which may damage it, all blows being absorbed by the ring.

Figure 5:
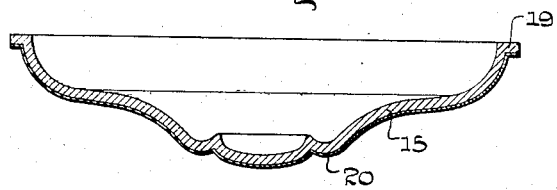
Fig. 5 is a similar section through the female shell after its removal from the model, illustrating the back thereof coated with solder or other suitable material preliminary to placing a metal back thereon.

Prior to being mounted in the ring 16, as above described, the shell 15 has its entire rear face or back covered or tinned with a layer or coating 20 of solder or other readily fusible material, as shown in Fig. 5. After being so coated or covered the shell 15 is placed in the ring 16 with its lip resting on the shoulder 17. The face of the shell 15 is then packed with molding sand or any other adaptable material, as illustrated at 21 in Fig. 6 and the ring 16 together with the shell 15 is inverted as shown in Fig. 7. The ring 16 and shell 15 are then heated after which they are placed in a mold box part of which is indicated at 22, with the back of the shell fully exposed. When so positioned the face of the shell 15 is supported by the sand 21 so that it will not become distorted or warped during the subsequent backing operation.

A soft metal backing 23 is then cast in a molten condition into the ring 16 upon the coated back 20 of the shell 15. This metal backing is made of any suitable alloy which requires less heat to melt than the material of which the shell 15 is made, which is usually copper. That is to say, the fusion point of the alloy constituting the backing 23 is lower than the fusion point of the material comprising the shell 15. The molten mass which makes the backing 23 melts the solder or other coating 20 on the back of the shell 15 and on cooling there is therefore a close adhesion between the shell 15 and the backing 23. The slope or slant 18 of the inner wall of the ring 16 is such that a relatively permanent connection is created between the backing 23, the shell 15, and the ring 16, with the lip 19 of the shell 15 firmly seated on the shoulder 17 of the ring.

It will be noted that the ring 16 is provided with the standard pin openings 24 for the reception of the pins 26 of the male die and with mounting sockets 25.

From the foregoing it is manifest that a female die is created, the face of which has every detail of the original model 10 and into which material may be forced or formed to become a replica of said model. The die thus formed may be quickly and easily made at relatively low expense and by reason of its construction sustains little if any wear.

In Figs. 8, 9, 10, 11 and 12 is illustrated the method of producing the male die 27 designed to force the material acted upon into the female die heretofore described, for the purposes of conforming it to the design, contour, shape and size thereof.

The male die 27 may be made by making a plaster or wax impression or pattern of the interior or front face of the female shell 15. This impression or pattern will conform to all of the details of the shell and a standard sand or other suitable mold can therefore be made therefrom. The male die 27 may then be cast in brass in the mold thus made and will substantially conform to all of the details of the female shell 15.

However, as the material operated upon often has substantial thickness, it is frequently desirable to allow for the same in forming the male die 27. This is accomplished by making a wax or plaster impression 35 of the face or cavity of the shell 15 of the female die and after said impression is set and hardened to take a second impression or intaglio 28 thereof in plaster or other suitable material, the cavity 29 thus created is coated with a layer 30 of wax or other adaptable material to render the impression water proof and acid proof, after which the cavity is sprayed with a coating comprising a mixture of lacquer or other binder and bronze powder. On being thus treated, the impression 28 is placed in a plating tank whereby a metallic shell 32 is deposited in the cavity 29 thereof. When the shell 32 has attained the approximate thickness of the material to be acted upon by the dies, the impression 28 is removed from the plating tank. A model or pattern 33, of any suitable material, is then made of the exposed surface or cavity of the shell 32. This model or pattern 33 conforms to all of the details of the female die shell 15 but compensates for the thickness of the material acted upon. A mold is then made from the model or pattern 33 thus created and a casting thereof is made in any suitable material, such as brass, and which when made constitutes the male die 27.

A male die 27 made in accordance with the immediately preceding method, on entering the shell 15 of the female die, will reach the inner end of its path of movement at a point removed from the shell 15 a distance equal or equivalent to the thickness of the shell 32, i. e. about equal or equivalent to the thickness of the material operated upon.

The male die 27 produced by either of the two foregoing methods is attached to a die plate 34 in any desired manner.

The male and female dies constructed in accordance herewith may of course be made to operate upon any material but they are particularly designed for the formation of relatively pliable fibrous materials, such as paper, pulp, asbestos, etc., which when formed will retain their given shape and design. It is to be noted that by having the lip 19 of the shell 15 of the female die positioned below the edge of the ring 16, the latter will receive all of the contact with the male die plate 34. In this manner the shell 15 is fully protected from damage during operation.

What is claimed is:

1. The combination with a die ring having an internal shoulder adjacent one edge and an inner wall sloping away from said shoulder, a shell mounted in said ring having an outstanding lip to rest on said shoulder in a plane below the plane of the ring edge, and a metal backing contained in said ring in intimate contact with the back of the shell and the sloping ring wall aforesaid.

2. The combination with a metallic ring having an internal shoulder adjacent one edge and an inner wall sloping away from said shoulder, a shell mounted in said ring and provided with an outstanding circumferential lip adapted to rest on said shoulder in a plane below the plane of the edge of the ring, and a metal backing cast in said ring at the rear of said shell to have intimate contact with the back of the shell and the sloping wall of the ring aforesaid.

3. The combination with a metallic ring having an internal shoulder adjacent one edge thereof and an inner wall sloping away from said shoulder, a shell, made by electrolytic deposit, mounted in said ring and provided with an outstanding circumferential lip adapted to rest on said shoulder in a plane below the plane of the edge of the ring, the back of said shell being coated with a readily fusible material, and metal backing cast in said ring to fuse the material of the back of the shell and be in intimate contact with the shell and sloping wall of the ring.

PAUL R. ZINSER.